Sept. 12, 1967 F. R. HERTRICH 3,341,070

RECORD MEMBER GUIDE DEVICE

Filed Dec. 17, 1964 2 Sheets-Sheet 1

INVENTOR
FRIEDRICH R. HERTRICH

BY Fraser and Bogucki

ATTORNEYS

INVENTOR.
FRIEDRICH R. HERTRICH
BY Fraser and Bogucki
ATTORNEYS

United States Patent Office 3,341,070
Patented Sept. 12, 1967

3,341,070

RECORD MEMBER GUIDE DEVICE

Friedrich R. Hertrich, San Jose, Calif., assignor to International Business Machines Corporation, Armonk, N.Y., a corporation of New York Filed Dec. 17, 1964, Ser. No. 419,070
5 Claims. (Cl. 221—119)

This invention relates to systems and devices for guiding web, sheet or card material, and more particularly to devices for controlling the plane of movement of a high-speed record member.

Modern high speed data processing mechanisms utilize various forms of tape, card and sheet members as record media for the performance of input and output data functions. Typically, these members are utilized with a handling mechanism which constrains the member to a fixed path. Thus, in a system using a magnetic record member, the record member is passed through a guide system and across the magnetic head assembly, with the guide system being designed to hold the record member in a given plane during intermittent bidirectional movement. The problem of achieving stability is substantially further complicated by the pliant or flexible nature of the record member and the desirability of avoiding surface contact on the record member.

The present invention is therefore concerned with control of the position of the principal plane of a moving record member by means other than restraint against a fixed member. While the plane of movement of the record member can be controlled by use of a positive gripping action, such as a vacuum hold-down action on the surface of a carrier drum, or by using differential pressure, as by passing the record member between a pair of parallel surfaces each of which provides an air bearing effect, such mechanisms are not practical for many modern installations. It is often desirable to be able to confine the movement of a record member to a given linear or curvilinear plane without the bulk, complexity or cost of such mechanisms, or without interposing such mechanisms within other assemblies.

A specific example of one type of system in which a control function of this nature is required is provided by modern random access memory systems which utilize storage strips or cards. The general oragnization of such a system is shown in the patent to Geddes, No. 3,126,008. A number of cards having magnetic surfaces are disposed in depending fashion within a receiving member, with address and gripping means provided on the uppermost edges of the cards. The cards are flexible and pliant and provide a substantial recording surface area. Many cards may be disposed within a storage cylinder, so that a total capacity of the order of billions of bits may be achieved by the memory. A single read-write station is positioned adjacent the cylinder, and includes means for selecting and extracting a given card, drawing the card into a rotary path past a recording-reproducing assembly for data transfer purposes, and then returning the card to the proper positon in the cylinder after the data transfer has been effected. The cylinder may then be rotated relative to the read-write station to present a new address for data transfer.

In such a random access memory, it is necessary to avoid contact of the recording surfaces with any stationary members, in order to eliminate the possibility of wear and the consequent loss of data. At the same time, the recording surface on the card must be passed very close to the head assembly, in order to permit high density recording and adequate signal reproduction. The mechanical movements, though intermittent, must be accomplished at extremely high speeds, of the order of a few hundred milliseconds at the most, for efficient use of the system. As is evident, the sudden withdrawal and movement of a pliant card, sheet or tape of this nature involves severe dynamic control problems. The card may have a lengthwise waviness, or a trailing end curvature, or be displaced from the desired path. In any such event the card is apt to be out of position relative to the extracting device, causing wear and/or malfunctions, neither of which can be tolerated. Once substantial positional variations of this kind are introduced during movement, they can be corrected only by means which would unduly complicate and limit the system.

Related problems are encountered in different environments. As one example, some random access memory systems extract a free moving card by gravity or pneumatic means, and feed the card into a guiding system for passage across a read-write assembly. In such installations, the leading edges of the record member is required to enter properly into a funnel or other guiding system, so as to avoid impact and wear or engagement with the sides of the guiding mechanism. A closely related application is one in which the leading edge of a magnetic tape is fed onto a reel or other windup mechanism in a self-threading system. In both of these applications, the free leading edge of the record member or tape must be confined to a given plane of movement without restraints acting on the broad surface of the record member.

In a different context, it is often highly desirable to provide differential control and stability for an unsupported length of moving web material. In a magnetic tape system, for example, it may be advantageous to have relatively long lengths of tape on each side of the magnetic transducer, but this is not usually done because of the oscillations which can arise in the unsupported tape. It is customary, therefore, to employ air bearing or roller guides and to maintain an appropriate tension in order to confine the tape to a specific path in the head region. Guide members of these types, however, introduce curves and restraints in the tape path, even if friction is kept to a minimum.

It is therefore an object of the present invention to provide an improved device for controlling the planar position of a planar member.

Another object of the present invention is to provide improved systems for controlling the position of the principal plane of a card, web or sheet record member without direct contact with the member.

Another object of the present invention is to provide means for precisely positioning the plane of a record member relative to a recording-reproducing assembly.

Yet another object of the present invention is to provide and improved system for controlling the planar position of a flexible and pliant magnetic record card during intermittent movement in a random access memory which mechanically removes the cards from and returns them to individual storage positions.

Another object of the invention is to provide an improved system for guiding the free leading end of a record or other web member into an associated mechanism without contact with or restraint upon the record member.

Another object of the present invention is to provide an improved means for controlling the plane of movement of a web member without the introduction of frictional, tensile or restraining forces on the web member.

Yet another object of the invention is to provide an improved means for damping tendencies of a moving web member to oscillate in a direction normal to the broad faces of the web member.

Yet another object of the invention is to provide an improved system for stabilizing the plane of movement of a web member with respect to a given plane, and without contact with the web member.

These and other objects of the present invention are achieved by a gaseous flow system which directs a gaseous medium transversely across the opposite planar surfaces of a record member. Members bearing longitudinal orifices are positioned along the path of the record member, at the longitudinal edges of the member. The orifices are connected to low pressure or vacuum sources which maintain pressures below the ambient level at the record member, so as to establish transverse gas flow. The pressure differential between the orifices and the ambient is sufficient to create differential airflow when the planar surface of the record member deviates in either direction from its nominal position. When this occurs, the differential airflow results in a relative decrease in pressure on the face of the record member opposite to the direction in which the displacement occurred. The pressure differential in turn results in the generation of a restoring force which tends to return the record member to its nominal position. The restoring force is such that it not only minimizes the average physical displacement of the record member from the desired path, but also substantially eliminates oscillatory displacements along the length of the member.

In accordance with another aspect of the invention, a guiding system in accordance with the invention may be utilized to control the planar movement of the free leading edge of a web member as it enters an associated mechanism. Jet orifices disposed symmetrically on each side of the web member confine it to a restricted plane of movement, without engaging the free end or the broad faces, until a point at which the web member is engaged by the associated mechanism. In accordance with another aspect of the invention, planar positioning devices utilizing jet orifices along the side edges of a moving web member may be employed to confine the web member to a given path, and to damp oscillatory movements, along substantial unsupported lengths of the member.

A better understanding of the invention may be had by reference to the following description, taken in conjunction with the accompanying drawings, in which.

Figures 1, 3, 4:
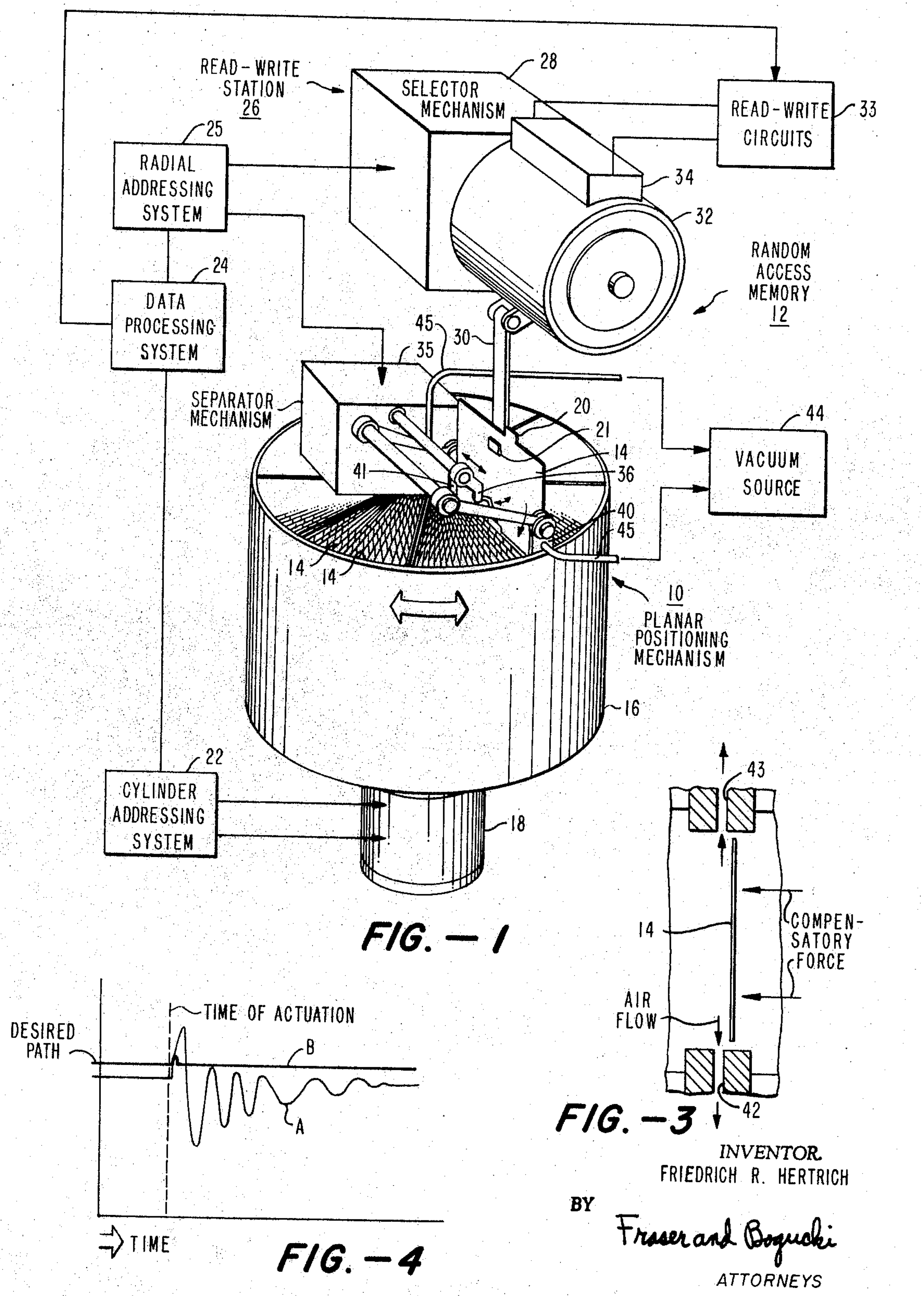
FIG. 1 is a combined perspective and block diagram representation of a random access memory using a strip positioning device in accordance with the invention.
FIG. 3 is a side sectional diagrammatic view of the relationship of a record member to a positioning device in accordance with the invention.
FIG. 4 is a graphical representation of the displacement of a record member under varying modes of operation.
Figures 2, 5, 6:
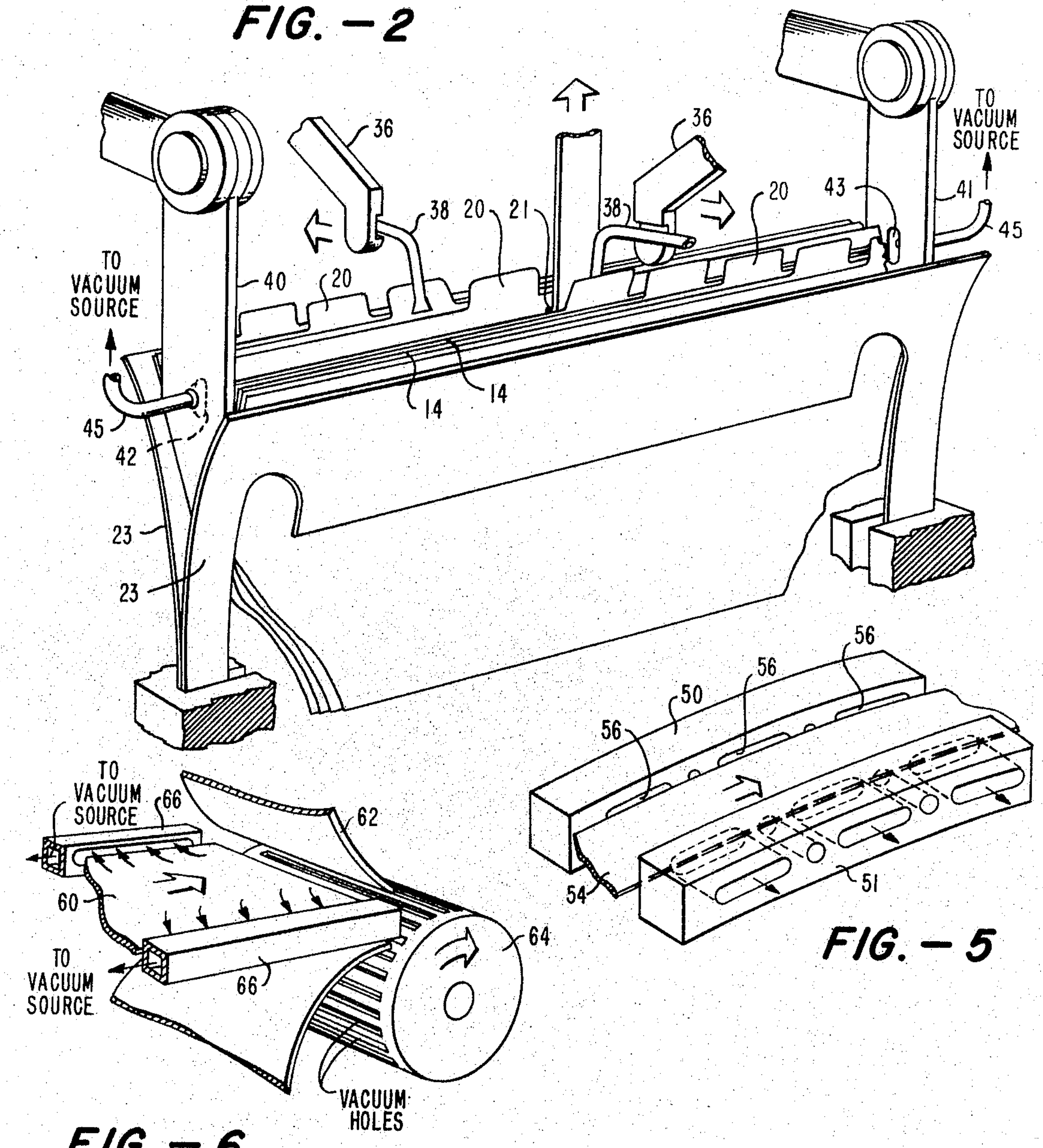
FIG. 2 is an enlarged fragmentary view of a portion of the arrangement of FIG. 1, showing the record member positioning device.
FIG. 5 is a fragmentary perspective view of a positioning device in accordance with the invention for controlling the movement of a record member in a curvilinear path.
FIG. 6 is a fragmentary perspective view of another exemplification of devices in accordance with the invention, showing control of the planar movement of the free leading end of a record member; and, FIG. 7 is a fragmentary perspective view of another device in accordance with the invention, showing control of the planar movement of substantially long unsupported sections of a record member.

Referring now to FIGS. 1 and 2, a positioning device 10 illustrative of the invention is shown as it is employed in a random access memory 12 of the type utilizing a plurality of magnetic record cards 14. The record cards 14 are disposed within a rotatable card storage cylinder 16 that may be turned to any selected circumferential position by a drive means 18. The cylinder 16 is divided symmetrically into a number of primary cells, each of which is further divided into subcells containing numbers of the magnetic record cards 14. As best seen in FIG. 2, cards 14 include index tabs 20 located at progressively different radial positions relative to the cylinder 16, so that the access mechanism may uniquely locate a particular card within a subcell. To prevent free movement of the cards 14 as the cylinder is accelerated and decelerated, each subcell includes front and rear springs 23 that are biased toward each other. The springs 23 restrain the cards 14 at their side edges. The cards 14 also include central withdrawal apertures 21 at which they may be engaged for removal from the subcell. The cylinder drive means 18 is controlled by an addressing system 22 which is shown only in block diagram form, but which receives the necessary commands from a data processing system 24, converts this data to a rotational location for the cylinder 16, and appropriately moves the cylinder 16.

The data processing system 24 also controls a radial addressing system 25 for a read-write station 26 having a selector mechanism 28 with an extendable selector arm 30 and a rotary card drum 32. Selector arm 30 and rotary card drum 32 are radially movable to a position corresponding to a desired record card 14 within a subcell. As described in Patent No. 3,126,008, the selector arm 30 then moves down to engage the withdrawal aperture 21 of the chosen card 14, and to extract the card 14 from the cylinder 16 and draw it about the surface of the drum 32, concurrently passing it for data transfer across a recording-reproducing assembly 34. Read-write circuits 33 controlled by the data processing system 24 are then operative during card passage. A separator mechanism 35 for the cards includes separator arms 36 which move in timed relation prior to the selector arm 30 movement to engage the tabs 20 of the cards immediately adjacent the selected card 14, and to force these adjacent cards apart, leaving the selected card better exposed. The subcell is opened for this action by separator wedges 40, 41 that enter within and move apart the front and rear springs 23 (best seen in FIG. 2). This action is further facilitated by a lubricating airflow from separator jets 38 which inject air streams along both broad faces of the selected card. As shown, the jets 38 may comprise the terminal portions of the separator arms 36. The basic elements of a random access memory in which this invention is employed are well known in the art and generally are illustrated and described in the aforesaid United States Patent No. 3,126,008. For this reason, a detailed description of the system and the various components employed are not included herein. Only certain modifications of the known elements and certain additional elements employed in conjunction with this invention are described herein to assist in a complete understanding of the invention. Any variations or additions pertinent to the present invention will be particularly pointed out herein in conjunction with the detailed description of the elements of the present invention.

The individual card 14 itself may be better visualized from the enlarged fragmentary view of FIG. 2. The card will typically be of the order of 2" wide by 13" long, and have a Mylar substrate with a magnetic coating on one side and a friction resistant carbon coating on the other. In one practical example, the substrate of Mylar is .005 inch thick, and the carbon coating is .0001 inch thick. A magnetic record card of this type is therefore readily flexible and substantially pliant, although it exhibits greater stiffness than a typical magnetic tape. As the separator arms act, the plane of the selected card within a subcell may be found to be transversely displaced by a substantial distance from the desired plane of movement. Then, the sudden gripping and withdrawal may tend to induce longitudinal oscillations along the length of the card. As described above, it is essential that each of the cards in the cylinder 16 be confined to the predetermined path with a high degree of exactitude. Otherwise, the card will not engage in the card extraction device causing intolerable malfunctions and card damage. The required precision of card positioning is not readily achieved because of the dynamic instabilities previously mentioned, which can be increased substantially by the presence of the air streams from the separator jets 38.

Positive control over the plane of movement of the card 14 is achieved by mechanisms in accordance with the invention. Such mechanisms utilize a pair of edge members each disposed parallel and adjacent to the path of movement of a differnt edge of the card 14. Here the edge members conveniently utilize the side wedges 40, 41 and each includes a jet orifice 42, 43 respectively (best seen in FIG. 2) symmetrically disposed about the center line of the plane of movement of the card 14. The orifices 42, 43 are oval in form in the present example, but the shape may be varied in accordance with more detailed considerations given below. Each of the jet orifices 42, 43 is coupled to a relatively low pressure or vacuum source 44 that establishes a relatively low pressure differential from the ambient. Flexible tubing 45 is advantageously used as a conduit for this purpose. If it is assumed that, as in the usual case, the ambient pressure is normal atmospheric pressure, a vacuum of the order of several inches of mercury may be drawn.

The operation of the guiding device in accordance with the invention may be better understood by reference to FIG. 3, as well as FIGS. 1 and 2. When a card 14 is extracted from the cylinder 16 it is imperative that it be moved along the desired plane, and be free of oscillatory displacements from the plane. The jet orifices 42, 43 establish reduced pressure at the very edges of the card 14, and establish some transverse airflow on each broad face from the central region of the card 14 toward the edges. When the plane of the card 14 lies in its desired path, the card is centered relative to the orifices and the flow rates are equal on both of the oppositely disposed broad faces of the card. The pressures are therefore in balance. If, on the other hand, as best seen in FIG. 3, the plane of the card should move substantially in a direction normal to one of the broad faces, a compensatory force is introduced. The jet orifices 42, 43 in each of the side wedges 40, 41, become exposed to varying extents, depending on the amount of displacement. In the example of FIG. 3 they are completely exposed to atmosphere, creating a substantial airflow on one side of the card only, that being the side toward which a correction is needed. In accordance with Bernoulli's law, the transverse airflow lowers the pressure in the region adjacent the jet orifices 42, 43. Accordingly, a pressure differential exists between the ambient pressure against the broad face of the card which in the direction of displacement of the card 14, and the pressure against the broad face of the card which is adjacent the jet orifices. The pressure differential varies substantially linearly over a given range of card displacements from the center line. Accordingly, the card is returned to the selected plane, and is held substantially on the center line at all points along the length of the card 14. The instantaneous displacement variation of the card from the center line is also kept to a minimum.

This compensatory force therefore makes possible the constrained movement of a mechanical record member in a direction normal to the plane of the record member body, even though the record member is moving at a high rate of speed. Substantially no frictional force or other constraints are introduced on the member, and the associated structure is kept to a minimum.

The graphical representation of FIG. 4 illustrates the manner in which devices according to the invention correct both lateral displacement errors and oscillatory tendencies in a random access system as illustrated in FIGS. 1–3. As shown in curve A the tendency for a card which is extracted without control is to undergo a substantial transient of an oscillatory nature, and to thereafter continue to oscillate relative to the desired plane. The average displacement from the desired plane is also substantial. The degree of average displacement is determined by the position of a card within the subcell, and by the attitude of the card relative to the vertical after the adjacent cards have been urged outwardly. A certain degree of displacement of the plane of the card cannot readily be avoided and it will be noted that mechanical means for urging the card into the desired path of movement would be both complex and expensive. As shown by curve B in FIG. 4, however, guiding devices in accordance with the invention correct for both the average displacement and the oscillatory tendency, without otherwise affecting or restraining card movement. The differential pressure acts as a stabilizing force to immediately urge the card into its correct plane of movement. The starting transient is further greatly decreased, and the pressure differential thereafter introduces a substantial amount of damping so as to effectively eliminate oscillations.

Inasmuch as the system is inherently stable, it may be employed in a variety of arrangements. Essentially, however, the width of the orifice should be greater than the thickness of the card, in order to provide some air flow along both of the broad faces of the card in the direction transverse to card movement. The width of the orifice should also not be substantially greater than the anticipated displacement of the card from the desired plane, in order that a differential pressure will be created by the departure from the nominal path. A large dimension in this respect would create less differential pressure and a low corrective force. As many orifices as may be desired may be employed along the longitudinal path, and the greater the degree of damping that is sought, the longer the orifices may be.

In one practical system in accordance with the invention, exemplified by the arrangements of FIGS. 1 and 2, the orifices are approximately 1/16" wide and 1/4" long. A vacuum of 2"–3" of mercury is maintained, with the air flow through an orifice being less than two standard cubic feet per minute. Within limits, greater stability is provided by increasing the rate of air flow and the pressure differential. It is preferred, however, to utilize an increased flow rate instead of a sharp increase in the degree of vacuum. It should also be noted that a cleaning effect is also achieved, by virtue of the continual removal of air from the card region. Dirt and oxide particles are thereby drawn from the system, with consequent improvements in reliability.

Bearing these considerations in mind, considerable variation can be introduced in the dimensions and relationships of the elements in the mechanism. For the specific random access memory system shown, for example, gas flow might be varied within the range from 1–4 standard cubic feet per minute, with the pressure being in the range from 2–6" Hg. The transverse and longitudinal dimensions of the orifices, under these conditions may each be varied over an approximate 2–1 range, with the orifice being from .020 to .100 inch from the edge of the card. Although the orifice itself might be varied substantially in shape, it is preferably a slot with square or rounded corners for this configuration.

It should be noted, however, that entirely different ranges of values might be required for other applications and systems.

Another arrangement in accordance with the invention is shown in FIG. 5, as applied to a system in which it is desired to move the record member in a curvilinear path. In this arrangement, jet plates 50, 51 are disposed along the opposite edges of the record member 54. An array of jet orifices 56 is disposed along the length of each jet plate 50, 51, the jet orifices being symmetrically disposed along the two plates 50, 51. As previously, the jet orifices 56 are coupled to a low pressure source (not shown), and are disposed along the desired path for the plane of the record member 54.

The jet orifices 56 provide air flow in a direction transverse to the member 54 longitudinal axis at each increment along its length, and therefore provide a restoring force when the plane of the member moves in either sense from the center line. Thus the member is confined to a predetermined curved path without any mechanical members bearing upon it. Because the member is suspended and free of friction and mechanical constraints of appreciable magnitude, the jet plates 50, 51 may provide additional jet blasts for edge guiding the record member to maintain it in a given transverse position, or for additionally moving the tape longitudinally or opposing the tape motion to decelerate it.

Some random access memory systems and magnetic tape transport systems seek to guide the leading edge of a record member along a path and into an associated mechanism, at which the record member is gripped by a vacuum member or other means for subsequent handling. In one such arrangement, illustrated generally in FIG. 6, the leading edge of a record member 60 passes into a funnel structure 62 for final guiding onto a pickup element 64, such as a vacuum capstan. The funnel structure 62 is not necessary, but is merely illustrative of the type of guide which may be employed. Whether a record card is employed, or whether the record member 60 is a pliant magnetic tape, departure from the nominal path will cause the leading edge to strike against the adjacent surfaces, causing wear or buckling of the member. In either event, the danger of loss of data or failure of the mechanism is present.

A guiding device in accordance with the invention, however, may advantageously be employed in combination with these arangements, to provide positive control of the path of movement of the leading edge of the record member. A pair or plurality of jet plates 66 positioned along the edges of the plane of movement act to confine the record member 60 to the predetermined path, independently of the longitudinal driving forces on the record member 60. Thus the record member 60 may be dropped in a gravity feed path, or advanced under pneumatic or magnetic forces, but the planar guide arrangements both constrain and stabilize the path of movement.

Figure 7:
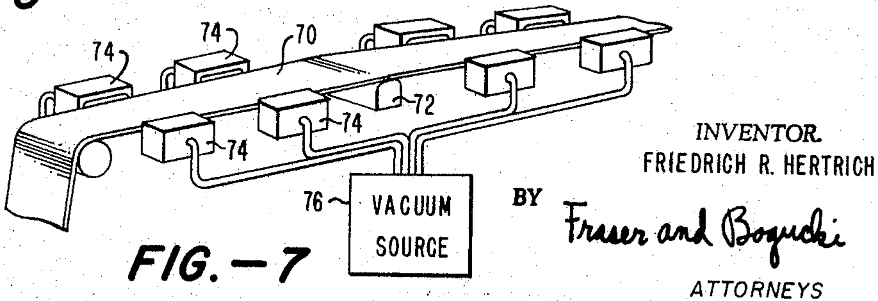

FIG. 7 illustrates application of guiding devices in accordance with the invention to the control of the position of long unsupported sections of a pliant member such as a magnetic tape 70 held across a head assembly 72. The tape 70 may be fed, for example, across the head assembly 72 from a pair of associated drive mechanisms, or a single mechanically actuated capstan (not shown). For either type of system, it is desired to maintain a uniform tape path in the region of the head assembly 72, while avoiding unnecessary friction and curvature in the tape path. Differential air flow mechanisms 74 in accordance with the invention positioned along the longitudinal edges of the tape and coupled to a vacuum source 76 accomplish these results and permit substantial simplification of the tape path.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a random access memory system having a plurality of cards to be withdrawn from separate subcells, each card being one of a plurality in a subcell, the cards being subject to displacement in a normal direction relative to a given plane, and to oscillatory displacement when withdrawn, the combination of: means for separating the cards on each side from a selected card, air jet means directing air streams on both sides of a selected card to facilitate withdrawal, means engaging a selected card for withdrawing the same from its subcell, and means disposed adjacent each longitudinal edge of the card in a subcell for stabilizing the position of the plane of the card, comprising means each defining at least one orifice adjacent each longitudinal edge of the card, and means establishing a lowered pressure through said orifice.

2. The invention as set forth in claim 1 above, and including in addition spring means retaining each plurality of cards within a subcell, and wherein the means for stabilizing the position of the plane of the card includes separator wedges for engaging and urging apart said spring means, said separator wedges including said orifices, and said means establishing including a vacuum source and flexible tubing coupling said orifices to said vacuum source.

3. The invention as set forth in claim 2 above, wherein the orifices are oval in shape, and centered on the given plane with the long axis along the plane, and have a transverse dimension substantially an order of magnitude greater than the thickness of the card.

4. A random access memory system for guiding memory cards maintained within cells into a predetermined path for feeding to a transducer assembly comprising selectively positionable cylinder means retaining a plurality of cards within separate cells, spring retaining means disposed within the cells for dividing groupings of cards into separate subcells, a card extractor mechanism positioned in fixed relation to the cylinder means, the card extractor mechanism including separator means movable along the opposite side edges of the cards to engage the spring retaining means to free the cards within the subcell, means engaging a selected card to withdraw the card from the subcell, and airflow means at said separator means and positioned along a desired path of movement for the selected card for establishing reduced pressure at the side edges of said card and a transverse air flow adjacent the broad faces of said card, said last mentioned means including different common outlets adjacent said card, the outlets being larger in the direction of card thickness than the card itself.

5. A random access memory system for guiding memory cards maintained within cells into a predetermined path for feeding to a transducer assembly comprising selectively positionable cylinder means retaining a plurality of cards in upstanding fashion within a plurality of separate cells, spring retaining means disposed within the separate cells, and engaging opposite sides of separate groupings of cards, to divide the groupings of cards into separate subcells, and a card extractor mechanism positioned in fixed relation to the cylinder means, the card extractor mechanism including separator wedge means engageable within any selected spring retaining means to spread the retaining means apart, thereby to expose the cards within the subcell, means engaging a selected card to withdraw the card from the subcell, said card extractor mechanism also including means for establishing air flow along each broad face of the card in a direction opposite to the withdrawal, and means associated with said separator wedge means and positioned along a desired path of movement for said card, said means including different common outlet means adjacent the longitudinal edges of said card and means coupled to the common outlet means for establishing pressures thereat lower than those existing at the broad faces of said card, thereby to establish transverse air flow relative to said card, the outlet means being substantially an order of magnitude greater in dimension in the direction of the card thickness than the card thickness itself.

References Cited

UNITED STATES PATENTS

| | | | |
|---|---|---|---|
| 2,645,480 | 7/1953 | Long | 271—74 |
| 2,650,830 | 9/1953 | Potter. | |
| 2,908,495 | 10/1959 | Andrews et al. | 226—95 |
| 3,053,425 | 9/1962 | Baines | 226—7 X |

| | | | |
|---|---|---|---|
| 3,087,664 | 4/1963 | Streeter | 226—97 |
| 3,126,008 | 3/1964 | Geddes. | |
| 3,167,216 | 1/1965 | Harker et al. | 221—88 |
| 3,176,279 | 3/1965 | Lin et al. | |
| 3,192,845 | 7/1965 | Schmidt | 226—97 X |

FOREIGN PATENTS

| | | |
|---|---|---|
| 363,816 | 12/1931 | Great Britain. |

ROBERT B. REEVES, *Primary Examiner.*

KENNETH N. LEIMER, *Examiner.*